Nov. 1, 1932.   L. C. KOOPMANS   1,885,358
SIDE BEARING
Filed Oct. 19, 1927
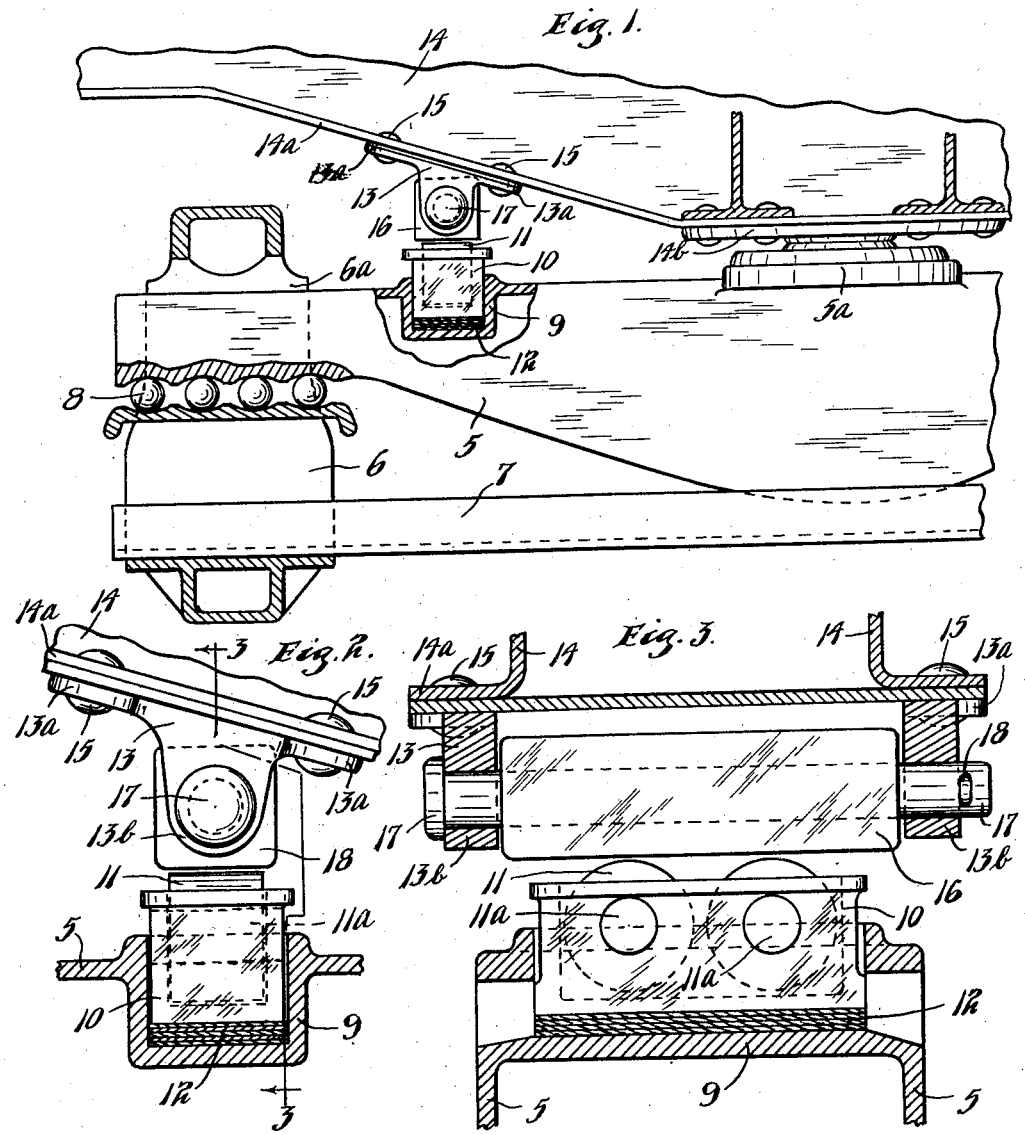
INVENTOR.
LAMBERT C. KOOPMANS.
BY HIS ATTORNEYS.

Patented Nov. 1, 1932

1,885,358

UNITED STATES PATENT OFFICE

LAMBERT C. KOOPMANS, OF CHICAGO, ILLINOIS

SIDE BEARING

Application filed October 19, 1927. Serial No. 227,226.

This invention relates to a side bearing such as used on railway cars. Such side bearings commonly comprise a housing with a bearing member such as a roller therein carried on the truck or body bolster and a member against which the roller bears, carried on the truck or body bolster, the roller member sometimes being carried on the body bolster and sometimes on the truck bolster. If the bearing wears, it is often desirable to adjust the same as by shimming up the roller support or roller housing. This usually requires lifting the roller or the roller housing or support some distance and in order to do this, it has heretofore been necessary to lift or jack up the car in order to give the necessary room.

It is an object of this invention to provide a structure of side bearing in which the desired adjusting or shimming operation can be performed without lifting the car from the center bearing or jacking up the car.

It is another object of the invention to provide a side bearing structure comprising a bearing member carried by the car body bolster having removable means for holding the same in position whereby said bearing member can be removed to give room to lift the bearing member on the truck bolster and shim up the same.

It is another object of the invention to provide a side bearing structure comprising a bearing roller and housing and a member cooperating with the bearing roller having a plurality of bearing surfaces, any one of which may be brought into position to co-operate with said bearing roller, said member being normally held in position by said bearing roller.

These and other objects and advantages of the invention will be fully set forth in the following description made in connection with the accompanying drawing, in which like reference characters refer to similar parts throughout the several views and in which:—

Fig. 1 is a view partly in side elevation and partly in vertical section showing a portion of the truck structure of a car and a portion of the body thereof with the side bearing attached;

Fig. 2 is a view similar to Fig. 1, showing a side bearing on an enlarged scale; and Fig. 3 is a vertical section taken on line 3—3 of Fig. 2, as indicated by the arrows.

Referring to the drawing, in Fig. 1 a portion of a car truck is shown, comprising the truck bolster 5, the side frame 6 having the bolster column 6a, the tie-plank 7 and the bolster bearings 8. The truck bolster is shown as having a recessed casing 9 therein in which is disposed a roller housing 10 forming part of the side bearing. The housing 10 has journaled therein a pair of bearing rollers 11 shown as having trunnions 11a journaled in the sides of the housing 10. A plurality of shims 12 are shown disposed under the housing 10 and between the bottom thereof and the bottom of the recess in casing 9. A bracket 13 is provided having lugs 13a at each side which are shown as secured to the flange 14a of the car body or bolster 14 as by the rivets 15. The center bearing for the bolsters is also shown comprising the engaging parts 14b and 5a carried respectively on the body bolster and truck bolster. The bracket 13 has depending end portions 13b between which is disposed a bearing member or block 16 having a longitudinally extending hole therethrough in which is disposed the headed pin 17, the head thereof engaging the outer side of one end member 13b, the pin being held in place by a locking means such as a cotter pin 18 extending through its other end outside of the other end position 13b. The member 16 is revoluble on the pin 17, but the same cannot revolve in the assembled structure owing to the fact that the lower surface thereof is adjacent the rollers 11 which are cylindrical in form and the top surfaces of which prevent rotation of said member 16.

In operation the side bearing functions as usual to have its bearing members 11 and 16 engage when the car body tilts. There is often at such time a relative longitudinal movement between the truck bolster and car body and at such times the member 16 rolls across the rollers 11.

If it is desired to adjust or shim up the housing 10, the same must be raised out of the casing 9. In the present structure this can be done without lifting or jacking up the car body by removing the cotter pin 18 and removing pin 17 from the bearing 13. When this is done the member 16 can be removed laterally and sufficient room is then afforded to lift the housing 10 so that the shims 12 can be placed thereunder. The housing can then be replaced and members 16, 17 and 18 again positioned as shown. The member 16 shown is provided with a plurality of surfaces, any one of which may be used to engage the rollers 11. These surfaces can successively be brought into play by also removing the pin 17 and then moving member 16 out of alinement with the rollers after which it can be turned and again inserted in place. As above stated, in the normal operation the member 16 cannot rotate as it is too close to the rollers 11.

From the above description it is seen that applicant has provided a very simple and efficient structure of side bearing and one in which the member on the car body or car body bolster is movable, so that the bearing member on the truck bolster can be adjusted or shimmed up without jacking up the car or removing the load from the center plate. This is a great improvement in a side bearing or car structure, as heretofore the adjustment of the side bearings has necessitated lifting the entire car body. With the present structure the side bearing can be adjusted with comparatively small labor and the adjustment easily and quickly made. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A side bearing structure having in combination, a bearing member having a plurality of circumferentially disposed faces, means carrying said member on which it is rotatable whereby different faces may be brought into operative position, a bearing roller against which one of said faces bears, said roller normally preventing rotation of said member for maintaining the operative face thereof in position.

2. The structure set forth in claim 1, said first mentioned means comprising a removable pin and a bracket carrying the same, whereby said bearing member may be removed and inserted and a different face brought into operation.

3. A side bearing structure having in combination, a bracket secured to the car body and having depending end members, a block having a plurality of surfaces disposed between said end members, a removable headed pin extending through said block and end members on which said block is rotatable, means for holding said pin in position and a bearing roller co-operating with one of said surfaces.

4. A side bearing for a car having in combination, a U-shaped bracket, a substantially horizontally disposed pin removably mounted in said bracket, a bearing member through which said pin extends and carried by said pin, a second bearing member mounted to permit of vertical movement and of less width than said U-shaped bracket, said bracket and said second bearing member being disposed in opposing relation on the truck, and body bolster of the car, so that said two bearing members may engage and said second bearing member may be carried into said bracket for lateral removal when said pin and first bearing member have been removed.

5. A side bearing for a car having in combination, a bracket of inverted U-shape secured to the body bolster, a housing mounted within a recess in the truck bolster for vertical removal therefrom, said housing being of less width than said U-shaped bracket and disposed below the same in position to permit the housing to be removed upwardly within said bracket to carry the same out of said recess, a horizontally removable pin mounted in said bracket, a bearing member through which said pin extends and a bearing member mounted in said housing for cooperation with said first mentioned bearing member.

6. A side bearing for a car having in combination, a bracket of inverted U-shape secured to the body bolster, a housing mounted within a recess in the truck bolster for vertical removal therefrom, said housing being of less width than said U-shaped bracket and being disposed below the same in position to permit the housing to be removed upwardly within said bracket to carry the same out of said recess, a horizontally removable pin mounted in said bracket, a bearing block through which said pin extends carried by said pin and a roller carried by said housing for cooperative engagement with the lower surface of said bearing block.

In testimony whereof I affix my signature.

LAMBERT C. KOOPMANS.